US010964230B2

(12) United States Patent
Kuo et al.

(10) Patent No.: US 10,964,230 B2
(45) Date of Patent: Mar. 30, 2021

(54) COMPUTING APPLIANCE FOR GEOMETRIC PLANIMETRY

(71) Applicant: National Taiwan Normal University, Taipei (TW)

(72) Inventors: Chin-Guo Kuo, Taipei (TW); Jung-Hsuan Chen, Taipei (TW); Chao-Fu Shu, Taipei (TW)

(73) Assignee: National Taiwan Normal University, Taipei (TW)

( * ) Notice: Subject to any disclaimer, the term of this patent is extended or adjusted under 35 U.S.C. 154(b) by 353 days.

(21) Appl. No.: 16/104,699

(22) Filed: Aug. 17, 2018

(65) Prior Publication Data

US 2019/0347958 A1 Nov. 14, 2019

(30) Foreign Application Priority Data

May 11, 2018 (TW) ................................ 107116072

(51) Int. Cl.
*G09B 23/04* (2006.01)

(52) U.S. Cl.
CPC .................................... *G09B 23/04* (2013.01)

(58) Field of Classification Search
CPC ......... G09B 23/02; G09B 23/04; G09B 23/00
USPC ......................................... 434/211, 212, 215
See application file for complete search history.

(56) References Cited

U.S. PATENT DOCUMENTS 2,885,795 A * 5/1959 Feldhake ............... G09B 23/04 434/212
2,902,778 A * 9/1959 Feldhake ............... G09B 23/04 434/211
2,929,159 A * 3/1960 Feldhake ............... G09B 23/04 434/211
4,137,652 A * 2/1979 Riccardi ............... G09B 23/04 434/212
2018/0172497 A1* 6/2018 Chen ....................... G01F 17/00

FOREIGN PATENT DOCUMENTS

WO WO-2013015638 A2 * 1/2013 ............ G09B 23/04

* cited by examiner

*Primary Examiner* — Robert P Bullington
*Assistant Examiner* — Stephen Alvesteffer
(74) *Attorney, Agent, or Firm* — Muncy, Geissler, Olds & Lowe, P.C.

(57) ABSTRACT

A computing appliance for geometric planimetry is provided, comprising a container, a vertical dividing rule, a horizontal dividing rule, a horizontal point line and a middle point line. A fluid is filled into the container, and the vertical dividing rule, the horizontal dividing rule, the horizontal point line and the middle point line are configured on a same instructing surface of the container and arranged on each of the periphery surrounding like a rectangle. When the container is vertically disposed, a fluid level is aligned with the horizontal point line. And, when the container is tilted to form at least one angle, an area of at least one geometric shape can be derived by employing the vertical dividing rule, the horizontal dividing rule, the horizontal point line and the middle point line.

13 Claims, 5 Drawing Sheets

10
1
4
2
51
50
100
60
3
20
53
30
a
a
b
5

COMPUTING APPLIANCE FOR GEOMETRIC PLANIMETRY

This application claims priority for Taiwan patent application no. 107116072 filed on May 11, 2018, the content of which is incorporated by reference in its entirety.

BACKGROUND OF THE INVENTION

Field of the Invention

The present invention relates to a computing appliance for geometric planimetry, and more particularly to a computing appliance for geometric planimetry which is based on training thoughts of a learner without any algebraic operations involved.

Description of the Prior Art

Typically, area is a geometric quantity, indicating a plane size of a limited and closed region. In general, measuring areas is quite important in human's life nowadays and has become one of the major contents in teaching math classes at school. Based on the teaching concepts nowadays, solving area problems are one of the geometries, in which children in the third grade start to learn some basic concepts of areas by covering square unit, and children in the fourth grade are introduced to a perimeter and an area formula of squares as well as rectangles.

Normally, a square is commonly utilized as a basic unit for measuring areas. Since rectangles and squares are easy to be covered by a unit area, multiplications are quite simple to be used for measuring their areas (a multiple of "numbers" times "unit area"). However, parallelogram, triangle and trapezoid can not be just fully covered by the unit area, so their areas cannot be calculated easily without using the formulas. For example, one solution is to utilize a parallelogram area formula first, and drag in triangle and trapezoid area formulas according to the parallelogram area formula subsequently. An advantage of this solution is that no algebraic operations are involved but only simply observing the shapes of these patterns. Nevertheless, this kind of solution is not natural enough, in which children can not solve the area problems spontaneously without teachers' help. Since the parallelogram, triangle and trapezoid area formulas have been introduced in most of the courses in the fifth grade, the above mentioned first solution is commonly used at school nowadays.

On the other hand, a second solution is proposed based on a rectangle and right triangle area formulas, in which a parallelogram, triangle or trapezoid is divided into rectangles and right triangles first. When areas of these rectangles and right triangles are calculated, an area of the parallelogram, triangle or trapezoid can be computed by plus the areas of these rectangles and right triangles together. An advantage of this second solution is that children are able to solve the area problems on their own. Nevertheless, this kind of solution is involved with algebraic operations by using the formulas, thereby increasing difficulties for the little learners.

Therefore, regarding the above mentioned two solutions which are both based on the memorizing formulas and had to solve the problems by utilizing these formulas over and over again, children are not able to think on their own and thus lack of logical training. As a result, on account of above, to overcome the abovementioned problem, it should be obvious that there is indeed an urgent need for the professionals in the field for a new computing appliance for geometric planimetry to be developed that can effectively solve those above mentioned problem occurring in the prior design.

SUMMARY OF THE INVENTION

In order to overcome the abovementioned disadvantages, one major objective in accordance with the present invention is provided for a novel computing appliance for geometric planimetry, which is aimed to eliminate the shortcomings that spontaneous thinking and logical training are insufficient in the traditional teaching courses.

Another major objective in accordance with the present invention is provided for a container for sealing a fluid having specific quantity inside. A plurality of preset scale combinations are further disposed on an instructing surface of the container. As such, when the container is tilted and a variety of geometric shapes formed accordingly by a fluid level of the fluid along with the preset scale combinations, an area of at least three different geometric shapes can be derived by the present invention.

For achieving the abovementioned objectives, the present invention provides a computing appliance for geometric planimetry, comprising a container for containing a fluid inside; a vertical dividing rule disposed on a instructing surface of the container and comprising two scale lines which are in parallel with each other, wherein the two scale lines are individually disposed on a left side and a right side of the instructing surface; a horizontal dividing rule disposed on the same instructing surface and comprising another two scale lines which are in parallel with each other, wherein the another two scale lines are individually disposed on a top side and a bottom side of the instructing surface; a horizontal point line disposed on the same instructing surface, connected with two midpoints relatively on the left side and the right side of the instructing surface, and being in parallel with the horizontal dividing rule; and a middle point line disposed on the same instructing surface, located at a midpoint of the horizontal point line and being perpendicular to the horizontal point line.

Therefore, when the fluid is filled into the container and the container is vertically disposed, a fluid level of the fluid is aligned with the horizontal point line. While when the container is tilted to form at least one angle, an area of at least one geometric shape can be derived by employing the above mentioned vertical dividing rule, the horizontal dividing rule, the horizontal point line and the middle point line.

According to one embodiment of the present invention, wherein a fluid being used can be water. However, in order to have a better measuring and observing efficiency, a material of the container being used can be selected to be transparent, and the fluid is colored liquid.

In one embodiment, when the container is tilted to form a first acute angle, the fluid level of the fluid together with the horizontal point line, the left side and the right side of the instructing surface form two right triangles, and each of the right triangles has the same area. Under such a condition, an area of a trapezoid can be derived by employing the above mentioned vertical dividing rule, the horizontal dividing rule, the horizontal point line and the middle point line.

In another embodiment, when the container is tilted to form a second acute angle, the fluid level of the fluid will be aligned with a diagonal of the instructing surface, and forms a right triangle with the vertical dividing rule and the horizontal dividing rule. Under such a condition, an area of a right triangle can be derived by employing the above mentioned vertical dividing rule, the horizontal dividing rule, the horizontal point line and the middle point line. Accordingly, the first acute angle is less than the second acute angle.

In yet another embodiment, when the container is tilted to form a right angle, the fluid level of the fluid is aligned with the middle point line, and forms a rectangle with the vertical dividing rule and the horizontal dividing rule. Under such a condition, an area of a rectangle can be derived by employing the above mentioned vertical dividing rule, the horizontal dividing rule, the horizontal point line and the middle point line.

As a result, the proposed computing appliance of the present invention adopts a transparent container and a plurality of preset scale combinations disposed on its instructing surface for containing a fluid having specific quantity. The preset scale combinations are configured to be arranged on each of the periphery surrounding the instructing surface like a rectangle. Moreover, a horizontal point line is further disposed on half of a height of the instructing surface, and a middle point line is further disposed being perpendicular to the horizontal point line. Based on the above mentioned arrangements, when the transparent container is tilted, by observing a fluid level of the fluid along with those preset scale combinations, an area of at least one geometric shape can be derived accordingly. Apart from that, the present invention helps to solve those shortcomings which have been occurring in the traditional teaching courses and yet is able to become a both inventive and novel computing appliance for motivating learners to think on their own logically and spontaneously.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
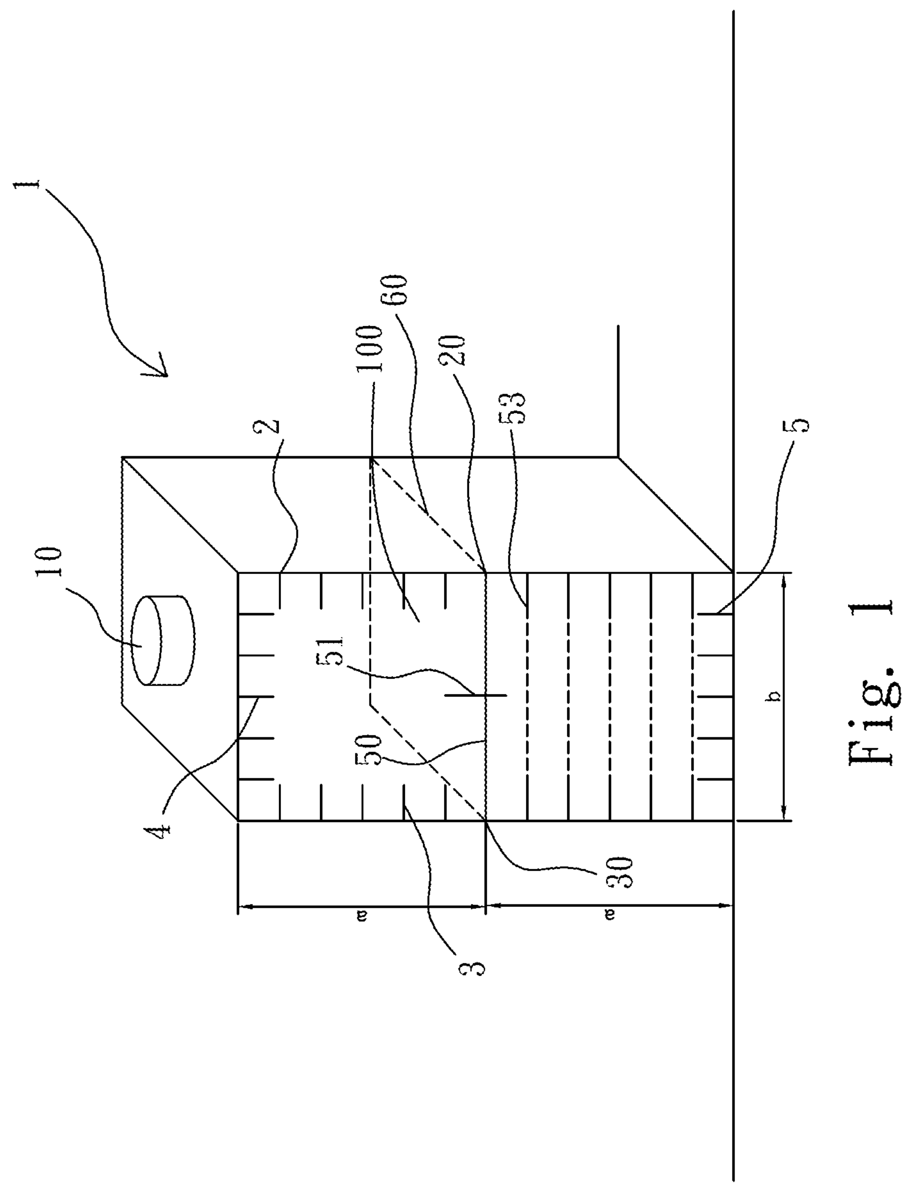
FIG. 1 shows a structural illustration of a computing appliance for geometric planimetry in accordance with one embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

The embodiments described below are illustrated to demonstrate the technical contents and characteristics of the present invention and to enable the persons skilled in the art to understand, make, and use the present invention. However, it shall be noticed that, it is not intended to limit the scope of the present invention. Therefore, any equivalent modification or variation according to the spirit of the present invention is to be also included within the scope of the present invention.

Figure 2:
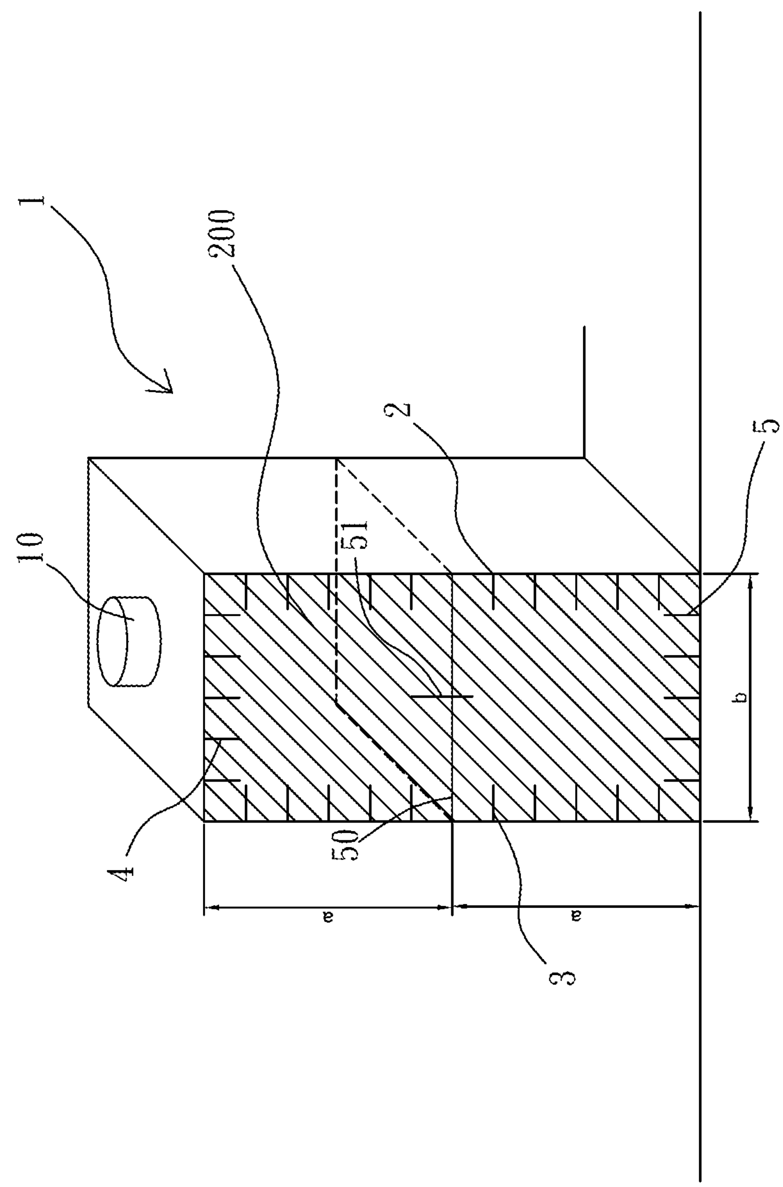
FIG. 2 shows a structural illustration of a computing appliance for geometric planimetry in accordance with one embodiment of the present invention.

In order to eliminate the shortcomings that spontaneous thinking and logical training are insufficient in the traditional teaching courses, one major objective of the present invention is to provide for a preferable modification, which is a novel computing appliance for geometric planimetry. Overall, for better understanding the contents of the present invention please refer to FIG. 1 and FIG. 2 first, which are structural illustrations of the computing appliance for geometric planimetry in accordance with one embodiment of the present invention. As shown in FIG. 1 and FIG. 2, the computing appliance for geometric planimetry comprises a container 1, wherein a lid 10 is disposed on a top of the container 1 such that a fluid 100 having specific quantity is filled into the container 1 through the lid 10.

As shown in FIG. 2, an instructing surface 200 is configured on the container 1. By designing a plurality of scale combinations on the instructing surface 200 and observing a fluid level of the fluid 100 being filled into the container 1 along with the scale combinations, the present invention is able to perform area computing for geometric planimetry. In the following, we will get started with the scale combinations first.

Please refer to FIG. 1 and FIG. 2, a vertical dividing rule is disposed on the instructing surface 200 of the container 1, comprising two scale lines 2, 3 which are in parallel with each other. The scale lines 2, 3 are individually disposed on a right side and a left side of the instructing surface 200. Similarly, a horizontal dividing rule is disposed on the instructing surface 200 of the container 1, comprising another two scale lines 4, 5 which are in parallel with each other. The scale lines 4, 5 are individually disposed on a top side and a bottom side of the instructing surface 200. As such, these scale lines 2, 3, 4, 5 are configured to be arranged on the periphery of the instructing surface 200 of the container 1, forming a scale combination shaped in rectangle.

According to the embodiment of the present invention, as shown in FIG. 2, the two scale lines 2, 3 which are individually disposed on a right side and a left side of the rectangle, defines a "length" of the instructing surface 200, and the length is 2a. Similarly, the two scale lines 4, 5 which are individually disposed on a top side and a bottom side of the rectangle, defines a "width" of the instructing surface 200, and the width is b. Therefore, an area of the instructing surface 200 equals to (2a*b) as its "length" times "width".

A horizontal point line 50 is disposed on the same instructing surface 200, and connected with two midpoints relatively on a left side and a right side of the instructing surface 200. The horizontal point line 50 is in parallel with the above mentioned two scale lines 4, 5. A middle point line

51 is disposed on the same instructing surface 200 as well, located at a midpoint of the horizontal point line 50 and being perpendicular to the horizontal point line 50. In details, please refer to FIG. 1, the horizontal point line 50 is connected with one midpoint of the scale line 2 and another midpoint of the scale line 3, wherein the midpoint at left side is a label line 30, and another midpoint at right side is a label line 20. As a result, it is obvious that a rectangle area of the instructing surface 200 is just divided into half by the horizontal point line 50, which will be ½*(2a*b)=a*b ○ On the other hand, when the fluid 100 is filled into the container 1 and the container 1 is vertically disposed, a fluid level 60 of the fluid 100 will be just aligned with the horizontal point line 50. In other words, under such a condition, an area of the fluid 100 occupying the instructing surface 200 at this time will be equal to the rectangle area divided by the horizontal point line 50 as discussed earlier, which equals to (a*b).

Figure 3:
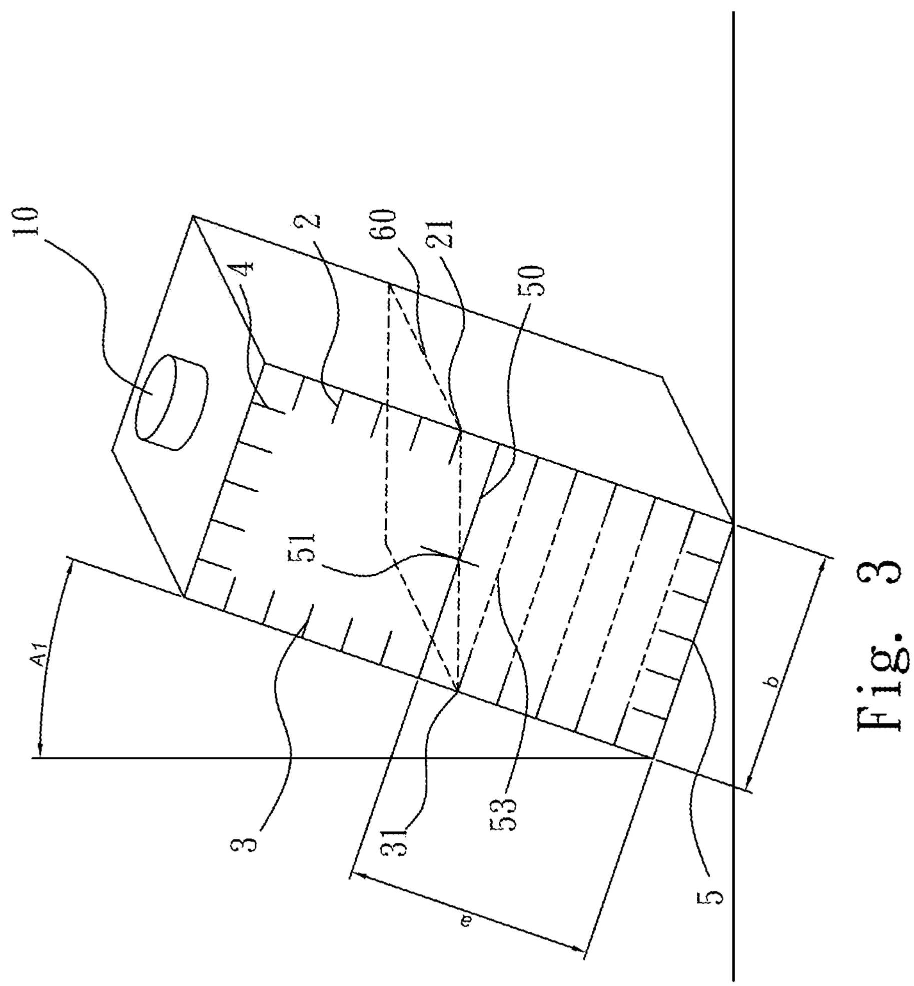
FIG. 3 shows a structural view of a computing appliance for geometric planimetry when measuring an area of a trapezoid in accordance with one embodiment of the present invention.

As a result, as shown in FIG. 3, when the container 1 is tilted to form a first acute angle A1 (i.e. 20 degrees), the fluid level 60 of the fluid corresponding to the scale lines 2, 3 of the instructing surface 200 will change by a single scale value, in which a scale value will be increased at the scale line 2 on the right side, indicating as a label line 21. And, the increased scale value will be equal to the scale value which is decreased at the scale line 3 on the left side, indicating as a label line 31. At this time, the fluid level 60 just passes through the middle point line 51 of the horizontal point line 50. Since the horizontal point line 50 is perpendicular to the scale lines 2, 3 disposed on both sides of the instructing surface 200, the fluid level 60 forms two right triangles with the horizontal point line 50 and the scale lines 2, 3, and the fluid level 60, the scale line 2 on the right side of the instructing surface 200 and a parallel line 53 which is in parallel with the horizontal point line 50 forms another right triangle. According to the embodiment of the present invention, based on a distribution of the scale lines 2, 3, 4, 5 of the instructing surface 200, the two right triangles formed by the fluid level 60 as well as the horizontal point line 50 have exactly the same area, for example Side-Angle-Side (SAS) or Angle-Side-Angle (ASA) triangle. Apparently, area of one of the two right triangles is composed of fluid, while area of the other is not.

As for another right triangle formed by the fluid level 60 and the scale line 2 on the right side of the instructing surface 200, one side of this right triangle (height) will be a width (b) of the scale line 5 on the bottom side of the instructing surface 200. While, another side of this right triangle (bottom) will be double of an increased scale value of the scale line 2 on the right side of the instructing surface 200. Under such a condition, an area of the fluid 100 occupying the instructing surface 200 will just be a lower half of the instructing surface 200, equal to a*b. As a result, it is proved that an area of a right triangle equals to ½*height*bottom. In addition, when the fluid level 60, the horizontal point line 50 and the scale lines 2, 3 form two right triangles, the whole fluid area develops as a trapezoid, and an area of the trapezoid is certainly the same as the original fluid area (a*b). Therefore, based on the embodiment of the present invention, so far as the trapezoid is concerned, we can consider the width "b" of the instructing surface 200 as a "height" of the fluid area, a scale line 3 (i.e. the label line 31) which the fluid 100 relates to on the left side of the instructing surface 200 as an "upper bottom", and a scale line 2 (i.e. the label line 21) which the fluid 100 relates to on the right side of the instructing surface 200 as a "lower bottom". As a result, the scale value increased on the lower bottom will certainly equal to the scale value decreased on the upper bottom. As such, 1/26*(a length of an upper bottom plus a lower bottom) will be an average length value for computing this fluid area, which will be length "a". As a result, it is proved that an area of a trapezoid equals to ½*(an upper bottom+a lower bottom)*height=a*b.

Figure 4:
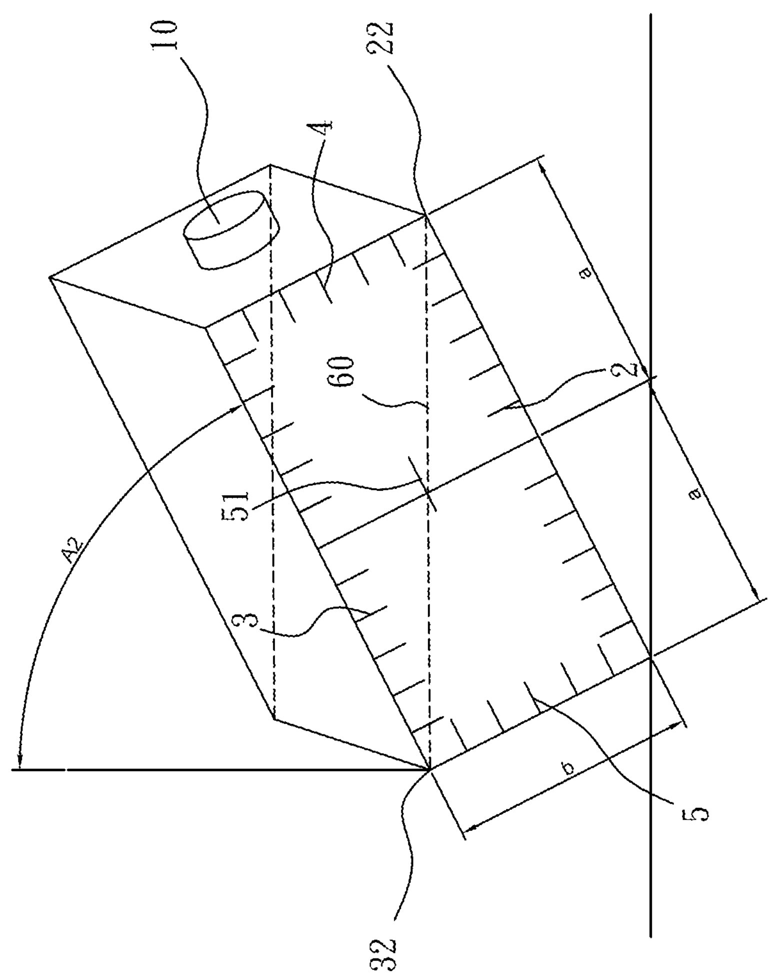
FIG. 4 shows a structural view of a computing appliance for geometric planimetry when measuring an area of a right triangle in accordance with another embodiment of the present invention.

FIG. 4 shows a structural view of a computing appliance for geometric planimetry according to another embodiment of the present invention. In such an embodiment, when the proposed container of the present invention is further tilted to form a second acute angle A2 (i.e. 45 degrees), the fluid level 60 of the fluid will be aligned with a diagonal of the instructing surface 200 in FIG. 2, and forms a right triangle with the scale line 2 on the right side and the scale line 5 on the bottom side of the instructing surface 200. In details, as shown in FIG. 4, when the container is tilted such that the fluid level 60 of the fluid is able to pass through a label line 22 of the scale line 2, which is the maximum scale value of the scale line 2, as well as a label line 32 of the scale line 3 which is the minimum scale value (zero) of the scale line 3, and the fluid level 60 also passes through the middle point line 51 of the horizontal point line 50, at this time a right triangle is formed by the fluid level 60 together with the scale lines 2, 3, 4, 5 distributed on the instructing surface 200. Apparently, an area of this right triangle will be the original fluid area, which is half of the area of the rectangle, i.e. ½*(a length of bottom*height). As a result, it is computed that an area of a right triangle will be ½*(a length of bottom*height).

Figure 5:
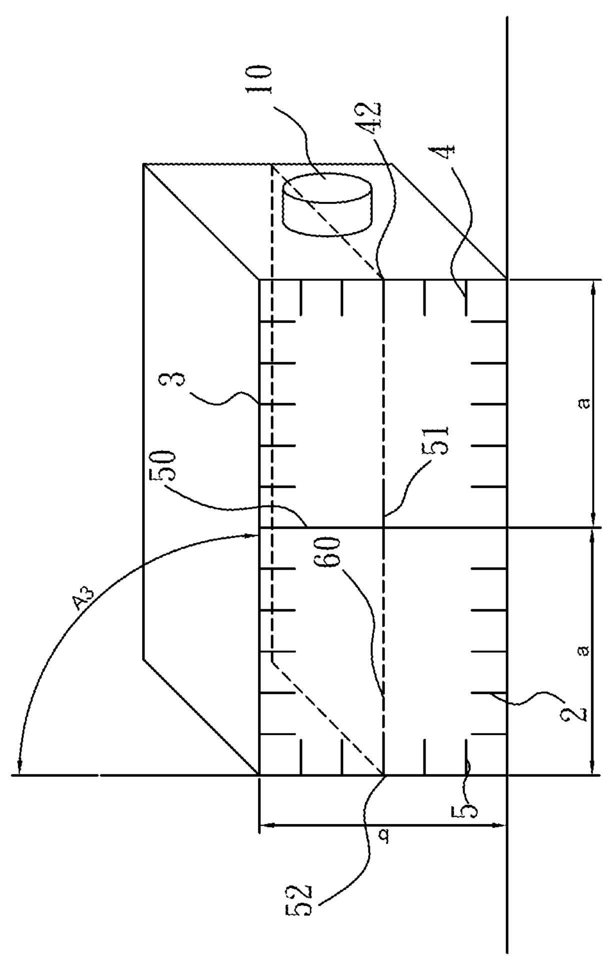
FIG. 5 shows a structural view of a computing appliance for geometric planimetry when measuring an area of a rectangle in accordance with yet another embodiment of the present invention.

FIG. 5 shows a structural view of a computing appliance for geometric planimetry according to yet another embodiment of the present invention. In such an embodiment, when the proposed container of the present invention is further tilted to form an right angle A3 (i.e. 90 degrees), the fluid level 60 of the fluid will pass through a label line 42 of the scale line 4 as well as a label line 52 of the scale line 5, and the fluid level 60 also passes through the middle point line 51 of the horizontal point line 50, at this time the area of the instructing surface 200 (shown in FIG. 2 as 2a*b) will be divided into half by the fluid level 60. That is, one length of the fluid area will be (b/2) while the other length will be 2a, forming another rectangle. And, an area of this rectangle will be (b/2)*2a=a*b=half of the original fluid area (i.e. ½*2a*b). Therefore, it is obvious that when the proposed container of the present invention is tilted to from a right angle (90 degrees), the fluid level 60 is aligned with the middle point line 51 and a rectangle is thus formed together with the vertical dividing rule and the horizontal dividing rule, it is computed that an area of a rectangle will be (a length of bottom*height) by employing the present invention.

Therefore, on account of above, the present invention indeed discloses a novel computing appliance for geometric planimetry, in which a fluid 100 having specific quantity, for instance having its fluid level at half of a height of the instructing surface 200, is filled into a container 1. By gradually tilting the container 1 and observing the fluid level along with a plurality of preset scale combinations (including the scale lines 2, 3, 4, 5, the horizontal point line 50 and the middle point line 51), the present invention is able to successfully compute areas of at least three different geometric shapes (i.e. rectangle, trapezoid, and right triangle). Furthermore, in order to get a better measuring and computing efficiency, a material of the container 1 can be selected to be transparent. Alternatively, the fluid 100, itself can be water, or colored liquid, which can also be utilized for implementing the objectives of the present invention.

In addition, a shape of the container 1 of the present invention is not limited to a cuboid. In other words, a shape of the container 1 may also be a cube according to other embodiment of the present invention, which means a width of the scale lines 4, 5 on a top side and a bottom side of the instructing surface 200 is double of a length of the scale lines 2, 3 on a right side and a left side of the instructing surface 200, i.e. b=2a. As such, by employing the above mentioned scale combinations as well as computing manners, areas of at least three different geometric shapes (i.e. rectangle, trapezoid, and right triangle) can be derived as well.

As a result, compared to the prior arts, the present invention certainly has disclosed a computing appliance for geometric planimetry which is much more instinct for leaners. According to the present invention, a fluid having specific quantity is filled into a container, and the container is equipped with a plurality of preset scale combinations. By gradually tilting the container and observing a plurality of geometric shapes which a fluid level of the fluid along with those preset scale combinations form, the present invention is able to compute and derive area formulas for these geometric shapes effectively. Accordingly, it is beneficial to bringing learners a much more instinct operating mode. When being applied to teaching courses at school, it also helps to stimulate learners so as to have a much stronger motivation for learning and thinking on their own.

Thus, based on the above descriptions, the Applicants assert that a computing appliance for geometric planimetry of the present invention is instinct, effective and highly competitive for incoming technologies, industries and researches developed in the future, and also solve the shortcomings that spontaneous thinking and logical training are usually insufficient in the traditional teaching courses. As a result, it is apparent that the technical characteristics, means, and objectives of the present invention are extraordinarily superior to the conventional arts and cannot be implemented easily by those skilled in the art. Thus, the present invention shall be patentable soon as well.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A computing appliance for geometric planimetry, comprising:

a container for containing a fluid inside;

a vertical dividing rule disposed on an instructing surface of said container and comprising two scale lines which are in parallel with each other, wherein said two scale lines are individually disposed on a left side and a right side of said instructing surface;

a horizontal dividing rule disposed on said instructing surface of said container and comprising another two scale lines which are in parallel with each other, wherein said another two scale lines are individually disposed on a top side and a bottom side of said instructing surface;

a horizontal point line disposed on said instructing surface of said container, connected with two midpoints relatively on said left side and said right side of said instructing surface, and being in parallel with said horizontal dividing rule; and a middle point line disposed on said instructing surface of said container, located at a midpoint of said horizontal point line and being perpendicular to said horizontal point line;

wherein when said fluid is filled into said container and said container is vertically disposed, a fluid level of said fluid is aligned with said horizontal point line; and when said container is tilted to form at least one angle, an area of at least one geometric shape can be derived by employing said vertical dividing rule, said horizontal dividing rule, said horizontal point line and said middle point line.

2. The computing appliance for geometric planimetry according to claim 1, wherein a material of said container is selected to be transparent.

3. The computing appliance for geometric planimetry according to claim 1, wherein said fluid is water.

4. The computing appliance for geometric planimetry according to claim 1, wherein said fluid is colored liquid.

5. The computing appliance for geometric planimetry according to claim 1, wherein said container is a cube or a cuboid.

6. The computing appliance for geometric planimetry according to claim 1, wherein when said container is tilted to form a first acute angle, said fluid level of said fluid together with said horizontal point line, said left side and said right side of said instructing surface form two first right triangles, and each of said two first right triangles has a same area.

7. The computing appliance for geometric planimetry according to claim 6, wherein said at least one geometric shape comprises a trapezoid, and an area of said trapezoid can be derived.

8. The computing appliance for geometric planimetry according to claim 6, wherein when said container is tilted to form a second acute angle, said fluid level of said fluid is aligned with a diagonal of said instructing surface, and forms a second right triangle with said vertical dividing rule and said horizontal dividing rule.

9. The computing appliance for geometric planimetry according to claim 8, wherein said at least one geometric shape comprises said second right triangle, and an area of said second right triangle can be derived.

10. The computing appliance for geometric planimetry according to claim 8, wherein said first acute angle is less than said second acute angle.

11. The computing appliance for geometric planimetry according to claim 1, wherein when said container is tilted to form a right angle, said fluid level of said fluid is aligned with said middle point line, and forms a rectangle with said vertical dividing rule and said horizontal dividing rule.

12. The computing appliance for geometric planimetry according to claim 11, wherein said at least one geometric shape comprises said rectangle, and an area of said rectangle can be derived.

13. The computing appliance for geometric planimetry according to claim 1, wherein a lid is further disposed on a top of said container such that said fluid is filled into and sealed in said container through said lid.

* * * * *